Sept. 11, 1945.    A. F. TURNER    2,384,578
OPTICAL ELEMENT
Filed March 10, 1943
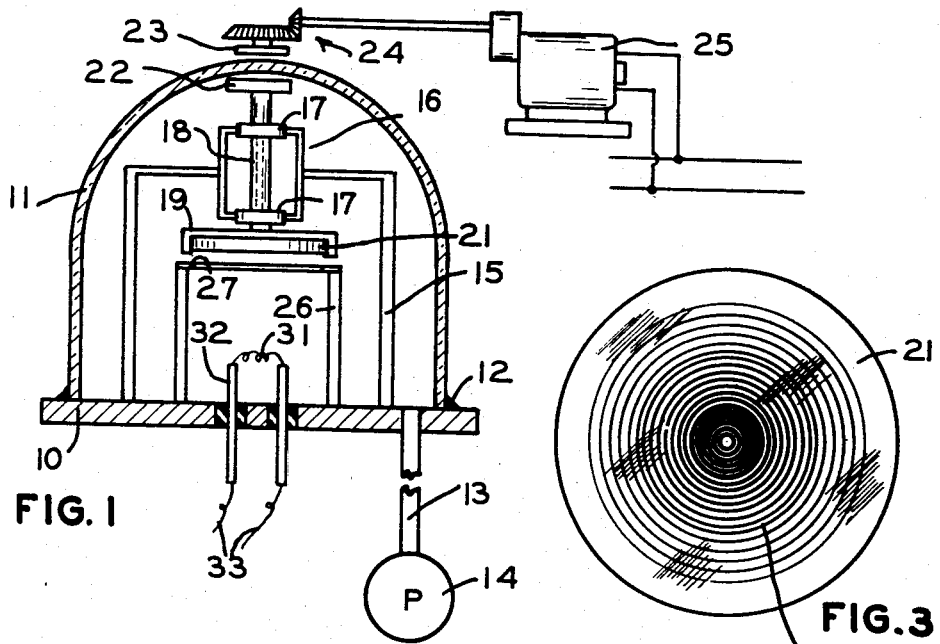
FIG. 1
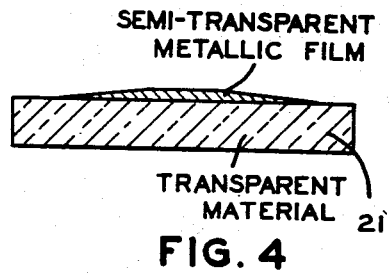
FIG. 3
FIG. 4
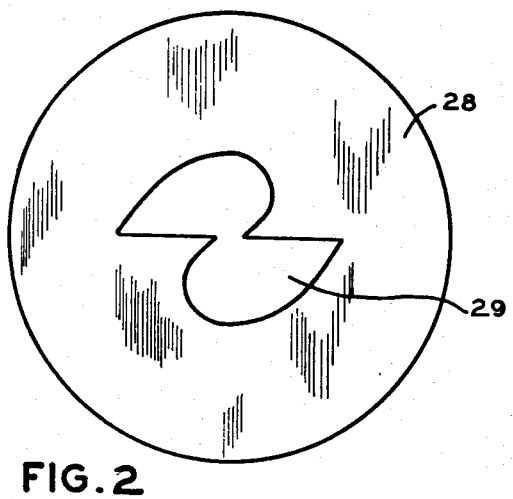
FIG. 2
ARTHUR F. TURNER
INVENTOR
BY
ATTORNEYS Patented Sept. 11, 1945

2,384,578

UNITED STATES PATENT OFFICE 2,384,578

OPTICAL ELEMENT

Arthur F. Turner, Brighton, N. Y., assignor to Bausch & Lomb Optical Company, Rochester, N. Y., a corporation of New York Application March 10, 1943, Serial No. 478,673

2 Claims. (Cl. 95—81)

This invention relates to an optical compensating means and to the method of and the apparatus for forming the same.

It is well known that light rays emanating from objects in the field of view of an objective lens in passing through the same, whether it be a single or multiple element lens, are brought to a focus on a plane generally termed the focal plane of the lens. The image formed is not uniformly illuminated, for it is not now believed possible to design a lens which gives perfect equality of illumination over the entire plane, that is, no lens has the power to throw as much light to the edge of the plane as to the center. However, in most instances, as in many photographic lenses, the field of view can be reduced and by proper disposition, and selection of the size, of the plate or film used, the illumination of the image can be made sufficiently uniform for most photographic uses and positives of substantially uniform density can be had.

However, in certain photographic lenses having an extremely wide field of view, generally termed wide-angle lenses, uniform illumination of the image has been sacrificed for other qualities desired in such lenses. Consequently, the illumination gradually fades away from near the center to the edge of the image formed by such lenses and the density of the resulting positives is not uniform.

To secure even illumination over the large field of wide angle lenses, it has been proposed to mount an opaque star-shaped diaphragm directly in front of the lens and revolve the diaphragm at a constant speed during exposure. The diaphragm although it reduced the illumination in the center of the field, introduced a number of difficulties which offset the advantage gained.

One object of the present invention is the provision of means for obviating the difficulties inherent in lenses having an extremely wide field of view without sacrificing the other qualities desired in such lenses, and specifically a means for equalizing the illumination of images formed by wide angle lenses without resorting to moving diaphragms.

The device of the present invention in the broadest aspects thereof comprises a compensating means for selectively controlling or modifying the density of a photographic positive or print and can be used with the camera at the time of the exposure or with the printing apparatus when the positive is made. Although it is particularly adapted for use as a compensator for remedying illumination faults of wide angle lenses, it is not limited to that use.

The compensating means, as now preferred, comprises a transparent body having a semi-transparent metallic film on at least one surface thereof. The film-forming metal when formed as a thin film on a transparent body should be substantially neutral when viewed by transmitted light. As the device in use will be subject to varying atmospheric conditions and hard usage, the film should be resistant to atmospheric corrosion as well as abrasive wear.

Where the device is used to cure inequality of illumination of wide angle lenses, the transmission qualities of the film should vary indirectly as the illumination varies over the focal plane of the lens with which the compensator is to be used. This quality of the film can be conveniently varied by varying the thickness of the film, and as the illumination of the area imaged by such lenses is greatest at the center, the film should be of a maximum thickness in that portion of the device traversed by the light rays which form the brightest portion of the image. The thickness of the remaining portion of the film should gradually change in proportion to the decrease in illumination in the outer extremes of the focal plane.

The compensator of the present invention is preferably formed by depositing under vacuum the film-forming material in varying thickness onto the desired surface of the body. One method of forming a film having the desired variable thickness comprises placing a template having a predetermined opening therein intermediate the film-forming material to be deposited and the body to receive the film. The template is moved relative to the body during the film-forming process and the resulting film deposited on the surface of the body will, due to the shape of the opening of the template, be non-uniform in thickness. The size and shape of the opening in the template and the resultant size and shape of the film will be determined by the design of the lens which it is desired to compensate, the transmission qualities of the film-forming material and the particular manner in which the compensator is used.

Although any metal or alloy having the desired characteristics can be used to form the film of the compensator of the present invention, excellent results have been obtained with the nickel-containing corrosion-resistant alloys such as are sold under the following trade-names: Inconel containing approximately 79.5% nickel, 13% chromium, and 6.5% iron; Nichrome V comprising substantially 80% nickel and 20% chromium; Chromel comprising 67-70% nickel and 15-19% chromium; K Monel of approximately 66% nickel, 29% copper, and 2.75% aluminum; and certain of the so-called stainless steels of the group generally designated as 18-8 steels.

The film need not have a maximum thickness coincident with the central portion of the body, for it might be desirable under particular circumstances to effect a control of the light incident on the focal plane of the lens or on the sensitized paper with which the positive is formed, different than that described.

Other objects and advantages will appear from the following description taken in connection with the accompanying drawing in which:

Fig. 1 is a sectional view partly in elevation of one form of the apparatus used for making the optical element of the present invention.

Fig. 2 is a top plan view of the template.

Fig. 3 is a top plan view of the compensator.

Fig. 4 is a sectional view of the compensator.

One form of the apparatus of the present invention, referring now to the drawing, comprises a suitable base plate 10 which carries an evacuable container shown here as a bell jar 11 of glass or other material. A vacuum-tight seal is formed between the lower edge of the bell jar 11 and the base plate 10 by any suitable sealing means 12. The bell jar 11 can be connected by any conventional means such as the pipe 13 to a high-vacuum pump shown here diagrammatically at 14.

The base plate 10 carries a plurality of stanchions 15 supporting a cage 16 to which is mounted a pair of bearings 17 supporting a vertical shaft 18. The shaft 18 preferably is formed of a tubular section to reduce the weight of the same and is fixed at its lower end to a carrier 19 for supporting the body 21, the surface of which is to receive the film.

The upper end of the shaft 18 carries a bar magnet 22 which lies closely adjacent to the upper surface of the bell jar 11. A second magnet 23 is mounted exteriorly of the bell jar 11 and closely adjacent the upper surface thereof and is used in the present invention to rotate the shaft 18. The magnet 23 is rotated through gear train 24 driven by a small electric motor 25 and it will be understood that upon rotation of the magnet 23, the magnet 22 fixed to the shift 18 will also rotate. Although the magnet 22 can be replaced by an iron core, it has been found that the size of the magnet 23 can be considerably reduced by using the magnet 22 rather than an iron core.

The base plate 10 also supports a plurality of stanchions 26 concentrically arranged inwardly of the stanchions 15 and supporting a carrier 27 for holding a template 28. The template 28 is formed with an aperture 29 through which vapor from the film-forming material carried by the filament 31 may pass to the under surface of the body 21 to condense thereon.

A pair of current-conducting posts 32 carried by the base plate 10 supports the filament above the same and the filament is energized by leads 33 interconnecting the posts 32 and a suitable source of current, not shown.

It will be obvious that the film could be deposited by means of a sputtering process, in which case the filament 31 would be replaced by an electrode of the metal or alloy which is to form the film. In a sputtering process, as in the evaporation process, particles of the material being sputtered would pass upwardly through the opening 29 in the template and adhere to the surface of the body 21 to form the film.

The size and shape of the opening 29 will depend on the particular lens which is is desired to compensate and the transmission qualities of the film-forming material. As the compensator of the present invention can be used with the camera at the time the exposure is made, either in front of the lens or intermediate the lens and the plate or film, as well as with the printer or other device for forming a positive of the negative taken, the particular manner in which the compensator is used will also affect the size and shape of the opening 29.

Whether the compensator be used with the camera lens or the printing apparatus, the opening 29 of the template 28 should be symmetrical about an axis coincident with the axis of rotation. It has been found that it is advisable to form the template 28 with at least two symmetrical communicating apertures which make up the opening 29 because such an arrangement tends to nullify irregularities in the deposit of the film arising from relative translational motion between the body 21 and the template 28.

If the compensator is to be used with the camera at the time the exposure is made, the size and shape of the opening 29 for forming the compensator for that use can be determined by ascertaining the illumination in the focal plane of the lens to be compensated. Research has shown that the illumination at any point in the focal plane can generally be determined by the equation $I_p = I_c \cos 4\theta$ where $I_p$ is the illumination at any point in the focal plane, $I_c$ the illumination at the center of the focal plane and $\theta$ the angle formed by the optical axis of the lens and a line joining the point $p$ and the center of the exit pupil of the lens. The transmission qualities of films of varying thicknesses of the film-forming material can be determined and the position the compensator will be disposed relative to the lens can be determined by the mounting means used and may be easily ascertained. It will be obvious that the compensator must be spaced from the entrance or exit pupil of the lens of the camera or printer for otherwise all rays would pass through the same portion of the compensator and there would be no differential compensating action on rays of different angles of incidence.

In the use of the illustrated form of the apparatus of the present invention, after body 21 has been placed in carrier 19 and the bell jar 11 sealed and evacuated, the magnet 23 is revolved as heretofore described to bring about rotation of the shaft 18 and consequently the body 21. The filament 31 is now energized to cause evaporation of the film-forming material. It is well known that vapors from the vaporizing material in the vacuum will travel in a straight line and a portion of the vapor will pass through the opening 29 in the template or diaphragm 28 and condense on the under surface of the body 21.

The amount of the film-forming material to be condensed on the surface body 21 will depend to some extent on the particular film-forming material used. Any metal or alloy which will form a neutral film when viewed by transmitted light and which film is resistant to abrasive wear as well as atmospheric corrosion can be used to form the film of the compensator of the present invention. Although a number of metals and alloys having the desired characteristics can be used, excellent results have been obtained with the nickel-containing corrosion-resisting alloys such as are sold under the following trade-names: Inconel containing approximately 79.5% nickel, 13% chromium and 6.5% iron; Nichrome V comprising substantially 80% nickel and 20% chromium; Chromel comprising 67-70% nickel and 15-19% chromium; K Monel of approximately 66% nickel, 29% copper, and 2.75% aluminum. It has also been found that certain of the so-called stainless steels of the group generally designated as 18-8 steel and comprising chromium and nickel can be used to form the film of the compensator.

Films of the alloys above mentioned are excellent for the purpose of the present invention, for these films are substantially neutral when viewed by transmitted light. They have a relatively high resistance to frictional wear and atmospheric corrosion. Such films are practically chemically stable. This is an important feature, since oxidation would affect the transmission qualities of the films.

In most uses of the compensator of the present invention, the same will be used to selectively control the density of the ultimate positive or print either with the camera at the time exposure is made or at the time the positive print is made from the negative. Where the lens is a wide angle lens, as the illumination is greatest in the central portion of the focal plane, the film will have a maximum thickness at the center portion thereof and will gradually decrease towards its outer portion. Such a film, as shown in exaggerated size in Fig. 4, would be substantially frusto-conical in shape.

It will be obvious that more than one compensator of the present invention can be used in series to effect a desired control of the density of either the negative or positive.

In the broadest aspects of the present invention, however, as the compensator can be used to selectively control the density of either the negative or positive, in some particular uses, it may be desirable to reduce illumination in other portions of the focal plane, or the density in other portions of the positive print, than the center thereof. Therefore, the compensator of the present invention is not limited to one having a film with a maximum thickness at the center thereof, for in the broadest aspects of the use of the compensator, the maximum thickness of the film can be formed at any portion of the filmed surface desired to effect a particular control.

It is to be understood, therefore, that while certain preferred embodiments of the invention have been illustrated and described herein, the invention is not to be limited thereby but is susceptible of changes in form and detail within the scope of the appended claims.

I claim:

1. An optical device for compensating the variations in intensity of the image produced by a lens and adapted to be positioned in optical alignment therewith, said device comprising a body of transparent material having opposite polished faces, a semi-transparent film of metallic material in optical contact with one face of the body, said film being resistant to abrasion and corrosion and having a substantially neutral effect on transmitted light rays, said film having a substantially frusto-conical shape with its thickest portion positioned centrally of the body and adapted to be positioned substantially in alignment with the axis of the lens.

2. An optical device for compensating the variations in intensity of the image produced by a lens and adapted to be positioned in optical alignment therewith, said device comprising a body of transparent material having opposite polished faces, a semi-transparent film of metallic material in optical contact with one face of the body, said material comprising more than 50% nickel, said film being resistant to abrasion and corrosion and having a substantially neutral effect on transmitted light rays, said film having a substantially frusto-conical shape with its thickest portion positioned centrally of the body and adapted to be positioned substantially in alignment with the axis of the lens.

ARTHUR F. TURNER.